United States Patent [19]

Kuntner et al.

[11] 4,306,265

[45] Dec. 15, 1981

[54] POWER INTERRUPTION PROTECTION SYSTEM FOR ELECTRIC MOTORS

[75] Inventors: Richard Kuntner, Milwaukee; James Vander Meer, Brookfield, both of Wis.

[73] Assignee: Eaton Corporation, Cleveland, Ohio

[21] Appl. No.: 186,079

[22] Filed: Sep. 11, 1980

[51] Int. Cl.³ .................................................. H02H 7/08
[52] U.S. Cl. ........................................ 361/31; 361/87; 361/96
[58] Field of Search ................ 361/31, 87, 92, 93, 361/94, 96

[56] References Cited

U.S. PATENT DOCUMENTS

| | | | |
|---|---|---|---|
| 3,581,179 | 5/1971 | Jones | 361/31 X |
| 4,006,387 | 2/1977 | Hudak | 361/87 |
| 4,259,706 | 3/1981 | Zocholl | 361/96 |

*Primary Examiner*—J. D. Miller
*Assistant Examiner*—Reinhard J. Eisenzopf

*Attorney, Agent, or Firm*—R. J. McCloskey; L. Vande Zande

[57] ABSTRACT

A power interruption protection system for AC electric motors. An electroresponsive relay (OL) in the energizing circuit of an electroresponsive main power contactor (MC) for an AC motor is responsive to deliberately deenergize the contactor if a power supply interruption persists for more than a few cycles of the supply frequency. A motor current level detector (CLD) monitors the motor current and if it falls below a predetermined level activates a pulse counter (CTR) to register pulses from a clock pulse generator (CPG) which produces pulses each half cycle of the supply frequency. If the pulse counter registers a certain number or more of such pulses an amplifier-driver (AD) energizes the relay to effect disconnection of the motor from the AC supply. The system is disclosed both as a stand-alone system, and as combined in a system affording current overload protection modes as well for AC motors.

11 Claims, 4 Drawing Figures

POWER INTERRUPTION PROTECTION SYSTEM FOR ELECTRIC MOTORS

The present invention relates to a power interruption protection system for electric motors which drive high inertia loads.

BACKGROUND OF THE INVENTION

Interruption of power on present day AC electrical distribution systems can present problems for AC electric motors driving high inertia loads. Under some conditions the dropout of the main electroresponsive connecting and disconnecting contactors may be prevented from occurring rapidly enough to prevent development of large surge currents that will be imposed on the motor when power is reestablished. Such surge currents can cause large torque shocks on the motor and driven machinery.

The main motor supply contactors have their coil energizing control circuits supplied from step-down control transformers that have their primary windings connected for supply ahead of the contactor power contacts. However, when power supply interruptions occur, energizing current to a control transformer is not immediately cut-off, due to the sustaining effect of the feedback motor counter voltage. Thus, the energizing coil of the main motor supply contactor can be held sufficiently energized for a period preventing rapid dropout of the contactor. If the power supply outage is in a critical duration range the aforementioned surge currents can occur due to electrical phase slippage between the motor and supply voltages. With motors driving high inertia loads, such critical duration ranges can readily occur because motor counter voltage will be maintained at high levels for longer periods when power interruptions occur.

To prevent such large surge currents, and possible attendant damage to motors and driven machinery from occurring it is desirable that the energizing circuit connections to the operating coils of such contactors be deliberately opened if the power outage to the motor persists more than a few cycles of the power supply frequency.

SUMMARY OF THE INVENTION

The power interruption protection system of the present invention senses when the normal motor running current decreases to a level indicating a critical power supply interruption. If supply current to the motor is not restored within 1½ cycles of the supply frequency, the system acts to completely interrupt the electrical supply connections to the motor.

The system continually monitors the motor current, and if it drops to 20% or less of this rated running value an electrical pulse counter is activated and accumulates half cycle pulses of the AC supply frequency. When the counter accumulates three pulse counts, a signal is generated which is amplified to effect operation of a relay in the energizing circuit to the operating coil of the electroresponsive contactor which causes the latter to open the power connections to the motor primary terminals.

The system can be used as a stand alone protection system or combined in a more comprehensive protection system affording protection against overload occurring during acceleration and/or during normal running, such as shown in applicant's copending application, Ser. No. 113,008, filed Jan. 17, 1980 and assigned to the assignee of the present application.

DESCRIPTION OF THE PREFERRED EMBODIMENTS

Figure 1:
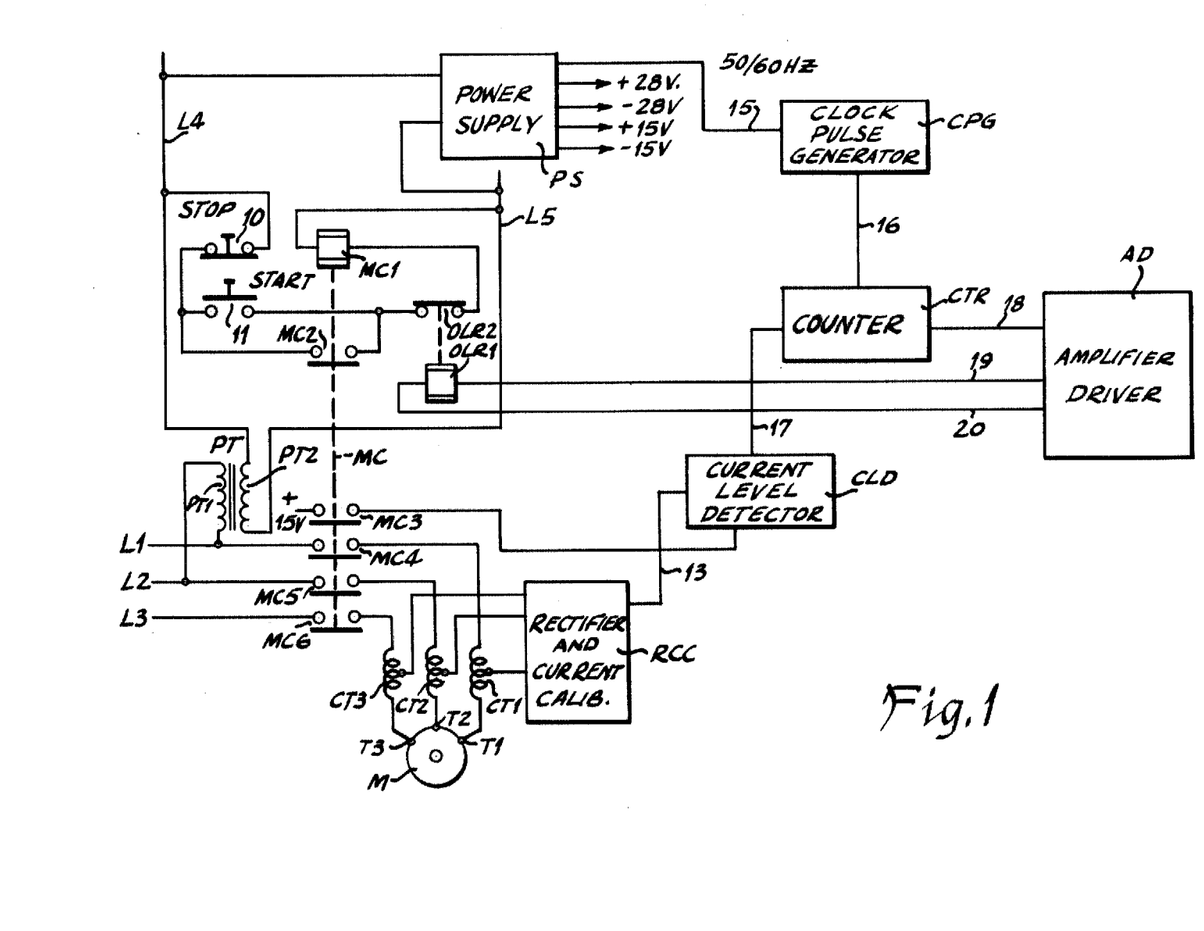
FIG. 1 is a combination schematic and block diagram of a preferred embodiment of a stand alone protection system in accordance with the invention as used in connection with the control circuit of a polyphase AC motor.

Referring to FIG. 1, it shows a polyphase AC power supply having supply conductors L1, L2 and L3 which are connectable respectively to the primary terminals T1, T2 and T3 of a three phase motor M upon closure of contacts MC4, MC5 and MC6 of an electroresponsive contactor MC. AC control lines L4 and L5 are supplied from the secondary winding PT2 of a step-down transformer PT which has its primary winding PT1 connected across supply lines L1 and L2. The operating coil MC1 of contactor MC is connected at one end to AC line L5 and at its other end in series with the normally closed contacts OLR2 of an electroresponsive relay OLR, normally open contacts 11 of a "start" switch 11, and normally closed contacts of a "stop" switch 10. Contactor MC also has an auxiliary set of normally open circuit maintaining contacts MC2 connected in shunt across start switch 11, and a second set of normally open contacts MC3 which when closed activates circuitry which is part of the present invention, as will hereinafter be explained.

Assuming that AC supply conductors are energized, the AC control lines will also be energized through transformer PT. Then if start switch 11 is closed, coil MC1 will be energized to close contact MC2 through MC6 of contactor MC. Consequently, motor M will then be connected to lines L1, L2 and L3 and will then accelerate to its rated running speed. Upon release of switch 11, the then closed contacts MC2 will maintain coil MC1 of the contactor energized until stop switch 10 is opened.

When motor M is thus connected to supply lines L1 to L3, three motor current sensing transformers CT1, CT2, and CT3 in current sensing relation to lines L1 to L3, respectively, supply three polyphase currents to a rectifier and calibrating circuit RCC. Circuit RCC as will be hereinafter fully described provides a unidirectional output signal whose magnitude is directly proportional to the resultant of the three phase motor currents supplied to motor M. This output signal is fed through a line 13 to a current level detector CLD which has a second fixed level input signal fed to it upon closure of contacts MC3 of contactor MC.

A power supply PS which has AC input connections to AC control line L4 and L5, provides an AC output a line frequency to line 15, and also provides +28 and −28 volt DC outputs and +15 and −15 volt DC outputs for purposes that will hereinafter be apparent. AC line 15 is connected to the input terminal of a count pulse generator CPG which may be assumed to provide an output pulse each half cycle of the AC frequency supplied by line 15. These output pulses are fed to the count pulse input terminal of a pulse counter, CTR through a line 16. The output signal from the current level detector is connected to the reset terminal of counter CTR through a line 17. The output terminal of counter CTR is connected through a line 18 to the input of an amplifier-driver AD which has its output connected through lines 19 and 20 to the coil OLR1 of relay OLR.

Assume that motor M is running at rated speed following closure of start switch 11 which results in closing of contacts MC2 to MC6 of contactor MC. The level of the signal outputs of rectifier/calibrator RCC to current level detector CLD will cause the output signal of the latter to the reset terminal of counter CTR to be at a high level. Consequently, the counter is reset and held inactive. Clock pulse generator CPG of course will be active to provide shaped input pulses to counter CTR in accordance with the AC line frequency, but will be of no effect so long as the aforementioned high level signal is maintained at the reset terminal of CTR.

Now, let it be assumed that at some point in the AC supply ahead of the contacts MC4 to MC6, there is an interruption in the three phase power supply that lasts at least for two complete cycles. The outputs of the motor current transformers CT1 to CT3 will immediately decrease to a level which acts through circuit RCC to cause the current level detector to immediately shift its output signal impressed at the reset terminal of counter CTR from a "high" to "low" level. Counter CTR is thereby unblocked and registers count output pulses fed into it from clock pulse generator CPG. When it has registered three clock pulses, it provides a signal in amplifier-driver AD which then provides an amplified output to energize the coil OLR1 of OLR. Relay OLR thereupon opens its normally closed contacts OLR2 to interrupt the energizing circuit for coil MC1 of contactor MC which opens to disconnect the motor M from supply lines L1 to L3.

If the power supply interruption lasts less than three half cycles, or 1½ cycles of the power supply frequency, counter CTR will not provide an output signal to amplifier-driver AD, and will be "reset" by reestablishment of a high level signal at its reset terminal and thereby readied to function on the occurrences of any subsequent power supply interruption.

A detailed description of the various elements and functions of the solid state portions of the circuitry will now be made in connection with FIGS. 2a and 2b which should be oriented left-to-right in that order.

The three phase current transformer CT1, CT2 and CT3 are arranged in inductive current sensing relationship to the supply lines L1, L2 and L3 between the contacts MC4 to MC6 of contactor MC and the primary terminals T1 to T3 of motor M. These current transformer secondaries are connected together in star at their left hand ends, and are connected at their right hand ends to the junction between the diode pairs D1–D2, D3–D4, and D5–D6 of a three phase rectifier bridge. The diodes D1, D3 and D5 have their cathodes connected to a positive potential conductor 19, and their anodes connect to the cathodes of the diodes D2, D4 and D6 respectively. The anodes of the latter diodes are connected to a conductor 20 which is connected to ground. A potentiometer rheostat RE1 has its resistance element connected in series with a resistor R2 across conductors 19 and 20.

Conductor 19 has a resistor R3 connected therein and the cathode of a zener diode ZD1 is connected at the left hand end of resistor R3. A capacitor C1 is connected at its high potential terminal to the right hand end of resistor R3. The anode of ZD1 and low potential terminal of C1 are commonly connected to the conductor 20.

Zener diode ZD1, resistor R3 and capacitor C1 provide transient protection for the rectifier current output which is proportional to the motor current at any instant. Potentiometer RE1 through adjustment of its slider permits calibration of the rectified DC current signal to a desired value when the motor current is 100% of its rated value. The conductor 13 connects the point common between resistor R3 and capacitor C1 to the inverting input terminal of an operational amplifier Z1 in the current level detector CLD.

The non inverting terminal of amplifier Z1 is connected to the point common between a pair of voltage dividing resistors R4 and R5 which are connected between +15 volts DC and ground. The DC bias terminals of Z1 are connected to +15 and −15 volts DC respectively and are also connected in series with capacitors C2 and C3 to ground. The output of Z1 is connected in series with a resistor R6 to the inverting input terminal of an operational amplifier Z2.

Amplifier Z2 has its non inverting input terminal connected to ground and its output terminal connected in series with a diode D7 to both input terminal of a NAND module Z3. A feedback resistor R7 is connected between the inverting input terminal of Z2 and the point common between the cathode of D7 and the input terminal of module Z3. A diode D8 is connected between such inverting input terminal of Z2 and the point common between the anode of D7 and the output terminal of Z2.

The inverting output terminal of NAND module Z3 is connected through conductor 21 to the upper input terminal of a NAND module Z4 which has its lower input terminal connectable through conductor 20 and normally open contacts MC3 of contactor MC to +15 volts DC. The inverting output terminal of module Z4 is connected through conductor 17 to the reset terminal MR of the pulse counter CTR which is a preferred form of the "4024" type.

As will hereinafter more fully be explained, when motor M is at rest with contacts MC3 and MC4 to MC6 of contact MC open but with lines L1 to L3 energized, the output level at the inverting terminal of module Z4 will be "high" so that counter CTR will be "reset" and all count output terminals will be held at a "low" non count or blocked levels.

A secondary winding PT3 of step down transformer PT has its end and center tap terminals connected to input terminals of power supply PS. The end terminals of winding PT3 are connected in series with diodes D9 and D10, respectively, and in series with a resistor R8 to the inverting input terminal of an operational amplifier Z5. A resistor R9 is connected between ground and the point common between the diodes D9 and D10 and resistor R8.

Voltage clipping diode D11 has its anode connected to the point common between the inverting input terminal of Z5 and has its cathode connected to the +15 volt DC source. A companion clipping diode D12 has its anode connected to the −15 volt DC source and its cathode to the point common between resistor R8, the anode of diode D11 and non-inverting input terminal of Z5. Voltage dividing resistors R10 and R11 are connected in series between the +15 volt DC source and ground, and the common point between them is connected to the non inverting input terminal of Z5. The output terminal of amplifier Z5 is connected in series with the inverting input terminal of an operational amplifier Z6.

Amplifier Z6 has its non inverting input terminal connected to ground. Its output terminal is connected in series with a diode D13 to the count pulse input terminal CP of a digital counter CTR which in a preferred form is of the "4024" type. A diode D14 is connected between the inverting input terminal of Z6 and its output terminal, and a feedback resistor R13 is connected between that inverting input terminal and the cathode of diode D13.

For each half cycle of AC voltage appearing across winding PT3, amplifier Z6 puts out a corresponding square wave pulse, which when its trailing edge goes from "high" to "low" at terminal CP of counter CTR causes the latter to register a count.

The counter CTR has the usual count output terminal $Q_0$ to $Q_2$ are used. The counter is supplied with DC power from the +15 volt DC source and also has connections to ground, and a capacitor C5 is connected between its +15 volt DC power terminal. Count output terminals $Q_0$ which goes from "low" to "high" on the first registered input pulse is connected to one input terminal of a NAND module Z7 and terminal $Q_1$ which goes from "low" to "high" on the second registered input pulse is connected to the other input terminal of module Z7. The inverting output terminal of module Z7 is connected to both input terminals of a NAND module Z8. The inverting output terminal of Z8 is connected in series with a resistor R15 to the base of an NPN transistor Q1 in amplifier-driver AD. Count output terminal $Q_2$, which goes from "low" to "high" upon registration of the fourth in a series of input pulses is connected in series with a resistor R14 to the base of transistor Q1.

It will be apparent that with $Q_0$ and $Q_1$ initially at "low" levels the output of Z7 will be "high" and thus the output of Z8 will be "low" because both of its input terminals will be "high". Now, when the third pulse is registered in counter CTR, both of the terminals $Q_0$ and $Q_1$ will be "high" and the output of Z7 will shift to a "low" output, thereby causing the output of Z8 to shift from a "low" to a "high" output. When the fourth count pulse is registered in counter CTR the output of terminal $Q_2$ shifts from "low" to "high".

The amplifier-drive AD comprises the transistors Q1, Q2 and Q3. The emitter of transistor Q1 is connected directly to ground, and its collector is connected in series with a resistor R16 to +15 volts DC, and has a resistor R17 connected between its base and ground. The point common between the collector of Q1 and resistor R16 is connected to the base of a PNP transistor Q2. The emitter of Q2 is connected in series with a resistor R18 to +15 volt DC and its collector is connected in series with a resistor R19 to −28 volts DC. The point common between resistor R19 and the collector of Q2 is connected to the base of an NPN transistor Q3. The emitter of Q3 is connected directly to −28 volts DC and its collector is connected through a diode D15 to +28 volts DC. One terminal of coil OLR1 of relay OLR is connected to +28 volts DC and the other terminal of such coil is connected to the point common between the anode of diode D15 and the collector of Q3.

With a "low" level DC signal impressed on the base of Q1 from the output of NAND module Z8 and from the output of terminal Q2, Q1 will then be non conducting. Consequently, the base of Q2 will be at the +15 volt DC level rendering the latter transistor non conducting. Thus the base of transistor Q3 will be only slightly above −28 volts DC, thereby holding Q3 non conducting. The terminals of coil OLR1 will be at +28 volts DC and slightly less than that respectively. Coil OLR1 will accordingly not be energized to a degree that will effect closure of its contacts OLR2.

When the output of module Z8 shifts to a "high" level, transistors Q1 and Q2 are successively rendered conducting to provide an amplified high level signal at the base of transistor Q3 to render the latter conducting. DC energizing current then flows from +28 volts DC through the coil OLR1, and the collector-emitter circuit Q3 to −28 volts DC. Coil OLR1 is therefore energized to open its contacts OLR2, which results in deenergization of coil MC1 of contactor MC and opening of contacts MC4 to MC6 to deenergize motor M. Upon subsequent deenergization of coil OLR1, diode D15 provided a local deenergization path for that coil.

The operation of the protection system will now be explained. Assume initially that supply lines L1 to L3 control lines L4 and L5, and step down transformer PT are energized. Further, let it be assumed that contactor MC is deenergized so that no current is supplied to motor M. Accordingly, the DC output signal from rectifier calibration circuit RCC via conductor 13 to the inverting input terminal of amplifier Z1 will be "0". Accordingly, the output of amplifier Z1 will be "high" and the junction of resistor R7, diode D7 and input to module Z3 will be zero as amplifier Z2 acts in the nature of a "perfect rectifier".

The output signal of NAND module Z3 will thus be at a "high" level and is impressed on the upper input terminal of NAND module Z4. Since contactor MC is deenergized its contacts MC3 will then be open so that the lower input terminal of module Z4 will be at a zero level. Accordingly, the output of Z4 will be at a "high" level which is imposed on reset terminal MR of counter CTR. Accordingly, counter CTR is reset and its count output terminal $Q_0$ to $Q_2$ are blocked at low levels preventing registration of counts in accordance with the pulses imposed at its count input terminal CP from clock pulse generator CPG.

Now, let it be assumed that contactor is energized to close its contacts MC2 and MC6. Closure of contact MC3 then causes the output of NAND module Z4 to shift from "high" level to a "low" level which then releases counter CTR to register the half cycle pulses provided from pulse generator CPG. However, due to the high in-rush current to motor M, it will be appreciated that the output of amplifier Z1 will quickly shift from "high" to "low" output, and amplifier Z2 will correspondingly quickly shift from a "low" to a "high" level output. Thus the output of module Z3 will also quickly shift from a "high" to a "low" level thereby causing the output of module Z4 to shift immediately back to a "high" level output which causes counter CTR to be reset and blocked against registration of count input pulses.

The elapsed time that the reset input terminal MR is at a "low" level during motor start up is so short that counter CTR will not be effected to provide count output pulses to module Z7 to shift it from a "high" to "low" level output status. Consequently, coil OLR1 of relay OLR cannot be energized during motor start up.

Now, let it be assumed that the motor M is running at normal speed. With potentiometer RE1 suitably adjusted the last mentioned output state of amplifiers Z1 and Z2, and NAND modules Z3 and Z4 will be maintained and counter CTR will be maintained in its count reset/blocked state. If the power to motor in lines L1 to L3 is, for some reason, interrupted ahead of contacts MC4 to MC6, and the current sensed by windings CT1 to CT3 subsides by more than 80% of the normal running motor current the output of amplifier Z1 will quickly shift back from a "low" to "high" level.

As will be appreciated this then results in a shift back in the output of amplifier Z2 from a "high" to a "low" level. Consequently, NAND module Z3 shifts its output back from "low" to a "high" level, and NAND module Z4's output shifts back from a "high" to a "low" level thereby unblocking counter CTR which thereupon registers the pulses impressed at its pulse input terminal CP from pulse generator CPG.

When the third pulse is registered terminals $Q_0$ and $Q_1$ shift from "low" to "high" signal levels causing NAND module Z7 to shift from a "high" to "low" signal level at its output thereby causing the output of NAND module Z8 to shift from a "low" to a "high" signal level. When the output of Z8 goes "high", transistor Q1 of amplifier-driver AD is rendered conducting, and as hereinbefore explained thus results in conduction of transistor Q2 and Q3 and energization of coil OLR1 to cause opening of its contacts OLR2 and deenergization of coil MC1 of contactor MC.

As power interruptions can occur at any place in a cycle of the power supply frequency, counter CTR registers the third and fourth pulses in the series and shifts the output of its terminal Q2 from a "low" to "high" signal level. This insures that deenergization of coil OLR1 will always be initiated between 1½ and 2 complete cycles of interruption of the polyphase AC supply to the motor. The motor M will, of course, act as a generator immediately following loss of main AC supply. Thus transformer PT and power supply PS will be maintained sufficiently energized for a period insuring the immediate deenergization of contactor MC aforedescribed.

Figure 2A:
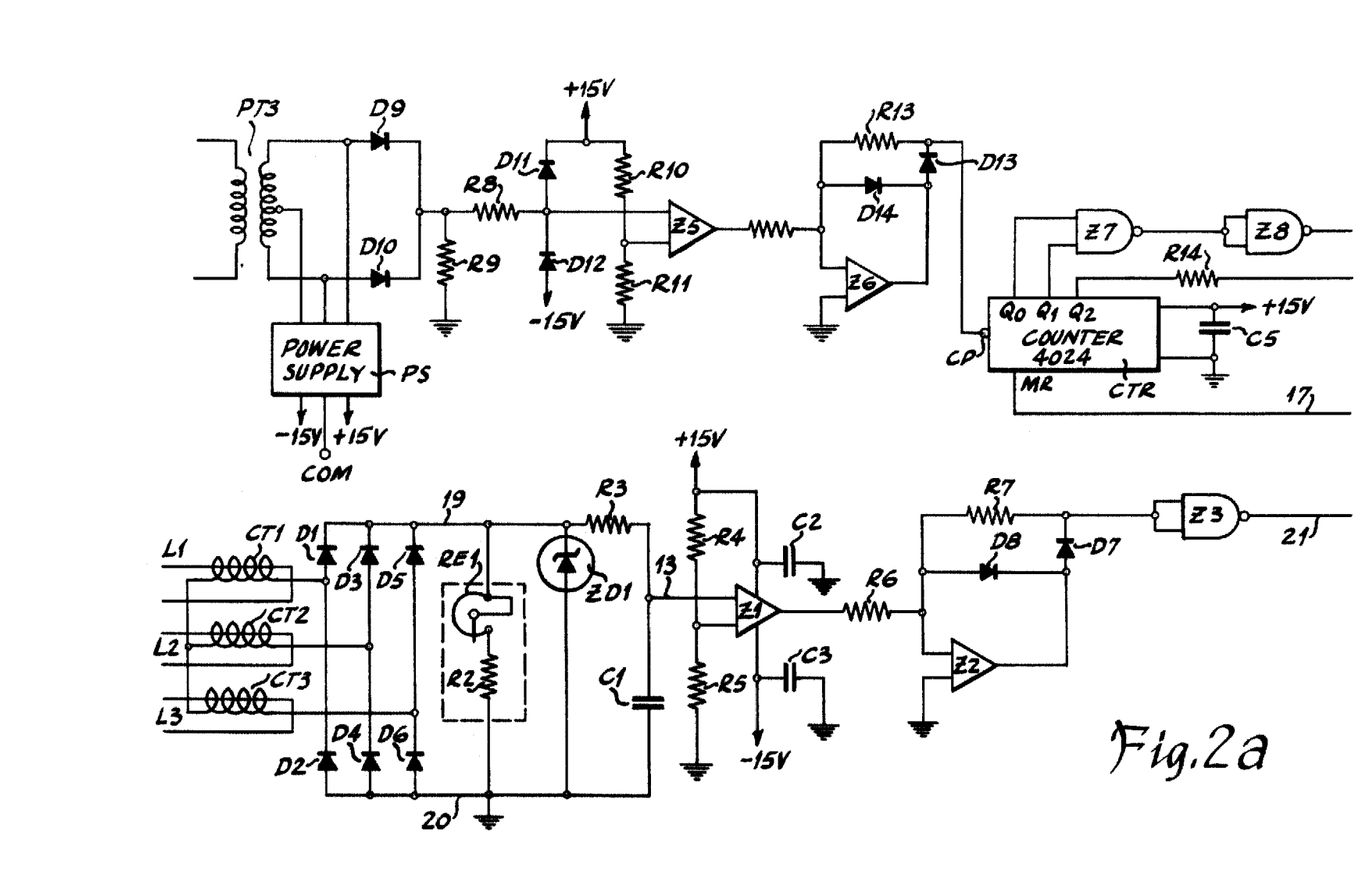
FIGS. 2a and 2b together are an electrical schematic diagram which more completely illustrates the embodiment of FIG. 1.
Figure 2B:
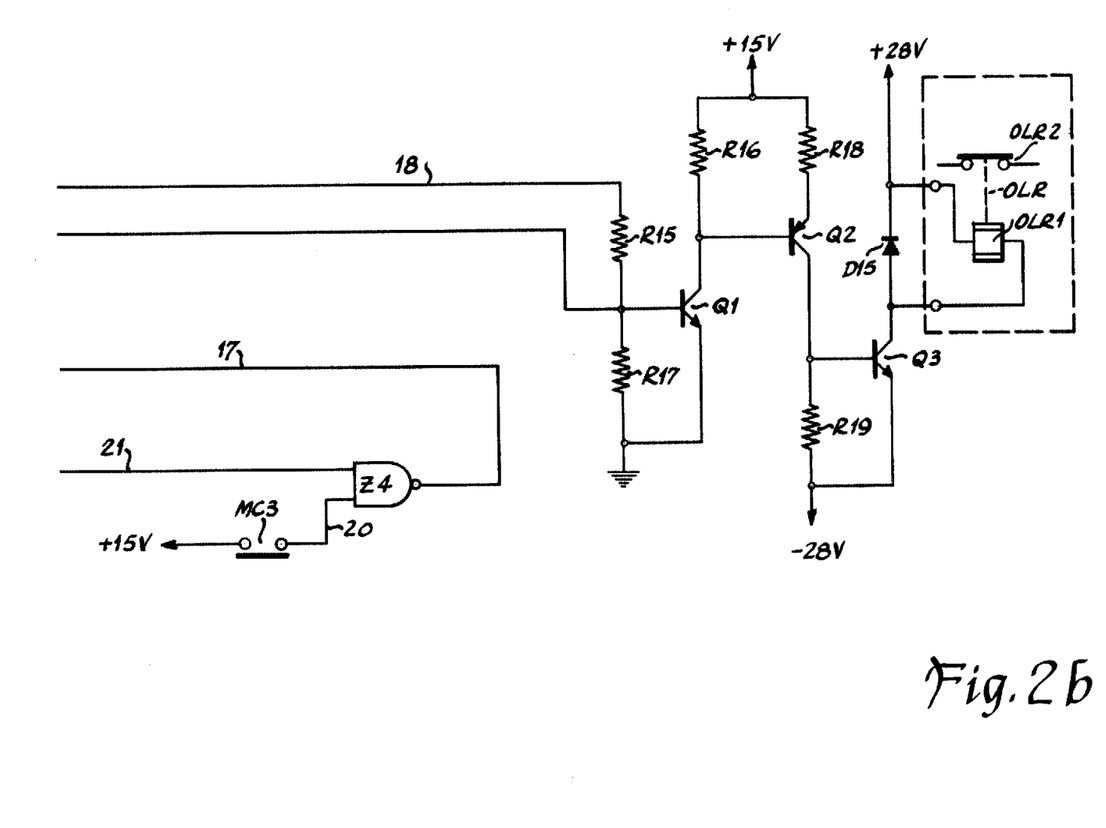

The embodiment of the invention hereinbefore described in connection with FIGS. 1, 2a and 2b is a "stand alone" system of power interruption protection, but the use of the invention is not so limited. It can be used as a part of a more comprehensive motor protection system as shown in FIG. 3.

Figure 3:
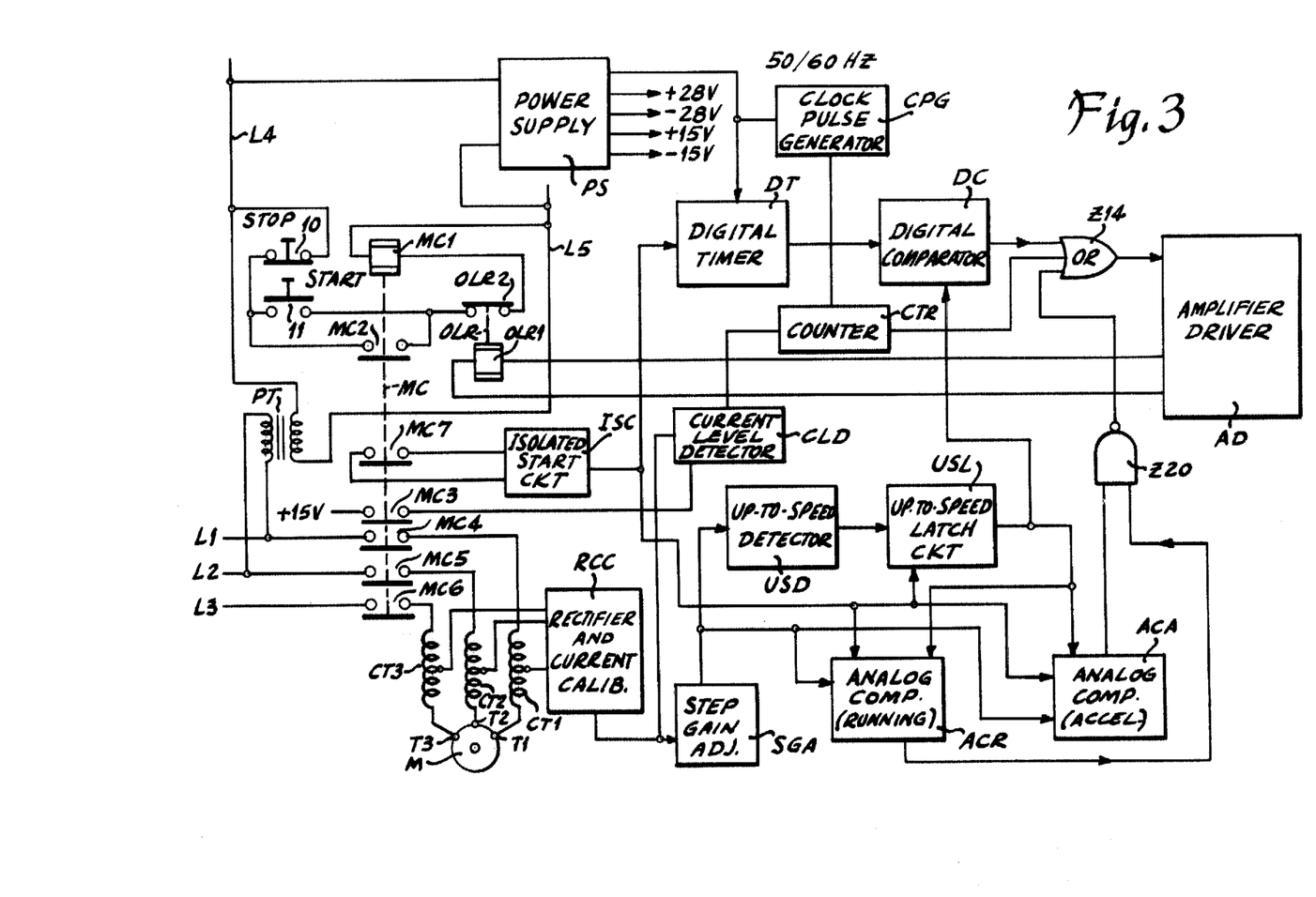
FIG. 3 is a figure similar to FIG. 1 but showing the invention as incorporated in a comprehensive protection system which additionally provides current overload protection during acceleration and normal running condition.

A considerable portion of the protection system of FIG. 3 comprises that disclosed in our co-pending application Ser. No. 113,008, filed Jan. 18, 1980 and assigned to the assignee of the present application. It will be apparent that in FIG. 3 that the arrangement of the "start" and "stop" circuits inclusive of relay OLR are similar to that hereinbefore described with the addition of normally open contacts MC7 of contactor MC which when closed activates an isolated start circuit ISC.

The current level detector CLD, clock pulse generator CPG and counter CTR are coordinated the same as before described, except that the count output signals from counter CTR feed into an input terminal of an OR module Z14. It may be assumed that when such input terminal is subject to the "high" level signal outputs from counter CTR that it will cause amplifier-drive AD to respond to energize relay coil OLR and thereby ultimately deenergize contactor MC.

The remaining elements schematically shown in block diagram form in FIG. 3 are shown and described in detail in our aforementioned copending application Ser. No. 113,008, and such application is incorporated herein by reference. However, the function of these elements as they relate to the system of FIG. 3 will now be described.

Closure of contacts MC7 causes the isolated start circuit ISC to become operative to render the solid state circuitry in the devices to be described. The output signal from circuit ISC renders digital timer DT active after a momentary time delay, and also readies an up-to-speed latch circuit USL, an analog comparator (running) ACR, and an analog comparator (accelerator) ACA for operation. The digital timer DT in conjunction with a digital comparator DC, has provision for selecting any desired time interval from 1 to 63 seconds as the maximum allowable time of acceleration of motor M to its rated speed. If the preselected time has elapsed and motor M has not reached its rated speed, digital timer DT acts in conjunction with digital comparator DC to provide a "high" output signal to the upper input terminal of OR module Z14 which then supplies a "high" output signal to cause amplifier-driver AD to effect energization of relay coil OLR1 and consequent deenergization of contactor MC.

When contactor MC closes to energize motor M the rectifier calibration circuit RCC is rendered active and supplies a unidirectional output signal to step gain adjust circuit SGA. SGA in turn provides an amplified DC output signal to up-to-speed detector circuit USD, and analog comparator circuits ACA and ACR.

If, during the acceleration period of motor M to its rated speed, a current overload exceeding a presettable magnitude in the range of 150% to 1,000% of rated running current is sensed by current transformers CT1 to CT3. The latter acting through circuit RCC and SGA supplies a DC signal to analog comparator circuit ACA of such a magnitude that the latter in turn supplies a "high" level DC output signal to an input terminal of a NAND module Z20. Z20 then shifts from a "0" to a "high" output signal which is imposed on the lower input terminal of OR module Z14. The output of module Z14 if previously "low" then shifts to "high" to activate amplifier-driver AD, which of course results in de-energization of motor M.

When motor M reaches its rated running speed up-to-speed detector USD responds to activate up-to-speed latch circuit USL which then provides a "high" DC output signal which deactivates comparator ACA, digital time DT and digital comparator DC, and activates analog comparator circuit (running) ACR. If, at any time during normal running operation of motor M, current transformers CT1 to CT3 sense motor runnings current in excess of another preselected magnitude, for example 107% of rated current, comparator circuit ACR then acts to provide a "high" level DC output signal to the other input terminal of NAND module Z20, which then in conjunction with OR module Z14, amplifier-driver AD, and relay OLR act to deenergize motor M.

If desired, the power interruption system of FIGS. 1 and 2, when combined with the system of our copending application Ser. No. 113,008, can have its own separate amplifier-driver AD and relay OLR. In that case the contacts of the two OLR relays would be connected in series in the energizing circuit for coil MC1 of contactor MC. With such arrangement, if after there is a motor shut down, the open set of contacts of one or the other of the two OLR relays would then indicate whether the shut down was caused by power interruption or by overloads occurring during acceleration or running.

We claim:

1. In a power supply interruption protection system for an AC electric motor which is connectable to an AC supply source by electroresponsive means, the combination with an electroresponsive relay which when energized causes said electroresponsive means to disconnect said motor from said supply source, of
   (a) means providing a control signal which varies in accordance with the motor current,
   (b) means in circuit with the AC supply and providing clock pulses each half cycle of the AC supply frequency,
   (c) a digital pulse counter subjected to said clock pulses and when active providing count output pulses in accordance with said clock pulses,
   (d) current level detector means subjected to said control signal and subjecting said counter to a count reset and count registering inhibit signal whenever the value of said control signal rises above a predetermined value, the last mentioned means upon decrease of said control signal below said predetermined value acting to unblock and allow said counter to provide count output pulses, and
   (e) means responsive to a fixed number of count output pulses from said counter to cause energization of said electroresponsive relay.

2. A power supply interruption protection system according to claim 1 wherein the first mentioned means comprise a current transformer associated with the AC supply lines to the motor and means rectifying the output of said transformer means to provide a unidirectional control signal which varies in accordance with the motor current.

3. A power supply interruption protection system according to claim 2 wherein said current level detector means comprises operational amplifier means and logic gating means which acts to impose a "high" level output signal on the reset terminal of said digital counter whenever said control signal is above said predetermined value, and acts to impose a "low" level output signal on said reset terminal of said counter whenever said control signal is below said predetermined value.

4. A power supply interruption protection system according to claim 3 wherein the last specified means comprises amplifier-driver means in circuit with said electroresponsive relay, and logic gating means having its output terminals subjected to the signals from said counter count output terminal, and its output connected to the input of said amplifier-driver means.

5. A power supply interruption protection system according to claim 4 wherein said counter has at least three count output terminals which shift from "low" to "high" level outputs upon registration of 1, 2 and 4 pulse counts respectively, and whereas said logic gating means includes two NAND modules connected in tandem between the 1 and 2 count output terminals and the input to said amplifier-driver, and wherein the 4 count output terminal is connected directly to the input of said amplifier-driver.

6. The combination with a polyphase alternating current motor of
   (a) means including an electromagnetic contact for connecting and disconnecting said motor from a source of polyphase AC supply
   (b) an electromagnetic relay having normally closed contacts in circuit with the energizing coil of said contactor to disconnect said motor from said source of AC supply,
   (c) means including current transformers in the supply connections to the motor primary terminal for providing a unidirectional control signal proportional to motor current,
   (d) means connected to said source of AC supply and providing clock pulses each half cycle of the supply frequency,
   (e) a digital pulse counter subjected to said clock pulses and when active to register such clock pulses providing count output pulses in accordance with the number of clock pulses registered,
   (f) current level detector means rendered active as a result of energization of said electroresponsive contactor to reset and block said counter from registering clock input pulses whenever said control signal rises above a predetermined value, the last mentioned means unblocking said counter to provide count output pulses when said control signal decreases below said predetermined value, and
   (g) means including amplifier-driver means responsive to a fixed number of count output pulses from said counter to cause energization of said electroresponsive relay.

7. The combination according to claim 6 wherein said means including said current transformers additionally includes adjustable means for setting the aforementioned control signal level in relation to motor current at motor normal running speed.

8. The combination according to claim 7 wherein said current level detector means comprises operational amplifier means and logic gating means which act to impose a "high" level signal on the reset terminal of said counter whenever said control signal is above said predetermined value, and which act to impose a "low" level output signal on said counter reset terminal whenever said control signal is below said other value.

9. In an overload and power interruption protection system for an AC electric motor which is connectable to an AC supply source by electroresponsive means, the combination with an electroresponsive relay which when energized causes said electroresponsive means to disconnect said motor from said supply source, of
   (a) means providing a control signal which varies in accordance with motor current,
   (b) means responsive to connection of the motor to said supply source to provide a timed output signal upon elapse of a present timed interval,
   (c) current overload responsive means activated by connection of said motor to said supply source to be responsive to a first predetermined value of said control signal to provide a first overload output signal,
   (d) second current overload responsive means responsive when activated to provide a second overload output signal whenever said control signal exceeds a second predetermined value,
   (e) means responsive to said motor attaining its running speed for deactivating said means providing said timed output signal and for activating said second overload responsive means, (f) means responsive to said control signal decreasing to a third predetermined value for a given number of more of the half cycles of the AC supply frequency to provide a power disconnect output signal, and (g) means responsive alternatively to said timed output signal, either of said first and second overload output signals, or said power interruption output signal to energize said electroresponsive relay.

10. An overload and power interruption protection system according to claim 9 wherein said means responsive to said control signal decreasing to a third predetermined value for a given number or more of the half cycles of the AC supply frequency comprises:

(a) pulse generating means providing an output pulse each half cycle of the AC supply frequency, (b) a pulse counter subjected to said output pulses and (c) current level detector means subjected to said control signal and providing a first level output signal whenever said control signal exceeds said third predetermined value to hold said pulse counter reset but inactive to register the count of pulses, and providing a second level output signal when said control signal decreases below said third predetermined value to render said counter active to register said output pulses from said pulse generating means, and provide a power disconnection output signal when a given number or more of such pulses are registered.

11. An overload and power interruption protection system for an AC electric motor according to claim 9 together with a second electroresponsive relay which has normally closed contacts connected in series with normally closed contacts of the first mentioned electroresponsive relay in the energizing circuit for said electroresponsive means, and wherein the last specified means comprises an amplifier-driver means responsive alternatively to said timed output signal, or either of said first and second overload output signal to energize said first mentioned electroresponsive relay, and second amplifier-drive means responsive to said power interruption output signal to energize said second electroresponsive relay.

* * * * *